United States Patent [19]

Walsh

[11] Patent Number: 4,776,799

[45] Date of Patent: Oct. 11, 1988

[54] PORTABLE, SELF-CONTAINED, EDUCATIONAL-ORGANIZATIONAL SYSTEM AND METHOD EMPLOYING SUCH SYSTEM

[76] Inventor: Susan M. Walsh, 12310 N.E. 13th St., Vancouver, Wash. 98684

[21] Appl. No.: 108,546

[22] Filed: Oct. 14, 1987

[51] Int. Cl.⁴ .............................................. G09B 19/00
[52] U.S. Cl. .................................... 434/238; 40/124.2
[58] Field of Search .............. 434/238, 203, 204, 108; 40/19.5, 374, 124.2, 107, 491; D19/64

[56] References Cited

U.S. PATENT DOCUMENTS

| | | | |
|---|---|---|---|
| Re. 30,959 | 6/1982 | Anderson et al. | 434/108 |
| 1,090,332 | 3/1914 | Morden | 40/374 |
| 2,512,485 | 6/1950 | Cougias | 434/238 |
| 2,965,978 | 12/1960 | Olson | 434/238 |
| 3,035,355 | 5/1962 | Holmes | 434/238 |
| 3,290,796 | 12/1966 | Gurda | 434/238 |
| 3,916,547 | 11/1975 | Ryder | 40/19.5 |
| 3,995,387 | 12/1976 | Lotts | 40/19.5 |
| 4,384,855 | 5/1983 | Walsh | 434/238 |
| 4,451,067 | 5/1984 | Williams | 40/124.4 |

Primary Examiner—James C. Yeung
Attorney, Agent, or Firm—Marger & Johnson

[57] ABSTRACT

The system of this invention comprises a system body which, in the open position, has a longitudinally-extending, substantially flat configuration for hanging the system onto a vertical support surface. The system includes at least one visually-coded activity marker means arranged on a side of the system for listing on a daily activity listing means at least one designated daily activity to be performed by said user. This produces a completed daily activity listing means. A plurality of completed daily activity listing means arranged on the system side together comprise an organized educational plan. Also in the system are visually-coded indicator means for evidencing the completion status of each designated daily activity. This allows for recognition by the user of the completion of a series of given activities which make-up the plan.

20 Claims, 2 Drawing Sheets

PORTABLE, SELF-CONTAINED, EDUCATIONAL-ORGANIZATIONAL SYSTEM AND METHOD EMPLOYING SUCH SYSTEM

BACKGROUND OF THE INVENTION

This invention relates to an organizational system which is portable and which provides a self-contained, directed comprehensive educational program for the system end user. Various organizational systems are known in the prior art. U.S. Pat. Nos. 1,090,332 and 3,916,547 described visual reminder systems for performing tasks and for file management. Re. No. 30,959 and U.S. Pat. No. 4,451,067 are directed to scheduling systems for orderly listing of jobs or operations and for project management. U.S. Pat. No. 3,995,387 is a shop display system for indicating the work load distribution amongst a group of workers. Finally, U.S. Pat. Nos. 2,512,485, 3,035,355, and 2,965,978 relate to rigid, stationary task performance boards for use by children. These devices record task completion on an ad hoc basis and, in some cases, provide some incentive for completion of such ad hoc tasks. However, none of these task performance board devices, or in fact any of the prior art devices, provides directed, repetitive, comprehensive instruction to the persons using them.

Therefore, a need exists for a portable organization system which provides a program that comprehensively directs the activities of its users, including children, on an overall educational basis, to create new and worthwhile daily activity patterns.

SUMMARY OF THE INVENTION

This invention is directed to a portable, self-contained organizational system, and to a method for implementing an organized plan employing such system, which is comprehensive and educational in nature, and which creates new and worthwhile daily activity patterns. This is accomplished employing a system and a method which are repetitive in nature, thereby changing old, unacceptable habits by establishing new positive habit patterns, which promote goal setting, and which shift the burden of responsibility and positive action to the end user.

The system of this invention comprises a system body which, in the open position, has a longitudinally-extending, substantially flat configuration for hanging the system onto a vertical support surface. The system body is composed of a flexible material. In the closed position, the system body is foldable so that it can be easily transported by the user, even if the user is a small child. This is contrary to the many rigid, stationary boards of the prior art. The system includes at least one visually-coded activity marker means arranged on a side of the system for listing on a daily activity listing means at least one designated daily activity to be performed by said user. This produces a completed daily activity listing means. A plurality of completed daily activity listing means are arranged on the system side together comprise an organized educational plan. Also in the system are visually-coded indicator means for evidencing the completion status of each designated daily activity. This allows for recognition by the user of the completion of a series of given activities which make-up the plan. In order to facilitate the recognition process, the visual-coding on the indicator means is the same as the visual-coding on the completed activity list means. Preferably, the respective activity marker, the completed activity list means, and the indicator means are color-coded for interactive use one with the other. The indicator means preferably comprises at least one color-coded bead movable between respective predetermined first and second positions on the system side for evidencing the completion status. More preferably, the indicator means comprises a loop means connected to the system side, each loop means having a pair of the color-coded beads, each bead having a different color, which are slidably mounted thereon for movement between respective first and second predetermined positions for evidencing the completion status.

The daily activity list means typically comprise daily activity cards, and the completed daily activity list means completed daily activity cards, and it may further include fastening means for both maintaining the system in a secure, closed position and for hanging the system in the open position onto a vertical support. The completed daily activity list means are preferably arranged on the system body in priority order to produce a selectively organized educational plan and the completed daily activity list means are arranged on the system side in longitudinally-space columns. The system further includes means attached to the system body for retaining the completed daily activity list means in a fixed position thereon and means for indicating the long-range completion status of the daily activities performed by the user, respectively.

This invention also relates to a method for implementing an organized educational plan by a user. Employing the subject system described above, this method comprises listing at least one visually-coded activity to be performed by the user onto each of a plurality of the daily activity list means to produce a plurality of visually-coded completed daily activity list means. The completed list means together comprises the organized educational plan to be implemented by the user. The plan is then retained in a secure position on the system side and the user performs to completion, on a daily basis, the designated daily activities listed in the plan. To visually evidence the completion status thereof, each of the indicator means are moved on completion of the performance of each activity by the user from a first predetermined position to a second predetermined position. The respective activity performing step and indicator means moving step are repeated on a daily basis for a predetermined period of time in order to reform the user's bad habits.

Typically, after performing all of the designated activities on a given day, the user records on the long-range indicator means the fact that all of the daily activities have been completed. The recordation process preferably includes the steps of providing a long range completion means comprising a monthly calendar having daily recording intervals, and recording the completion of the performance of all the activities in the daily recording intervals thereby providing goal-setting functionality to the system.

The foregoing and other objects, features and advantages of the invention will become more readily apparent from the following detailed description of a preferred embodiment which proceeds with reference to the drawings.

DETAILED DESCRIPTION OF THE DRAWINGS

DETAILED DESCRIPTION OF A PREFERRED EMBODIMENT

Figure 1:
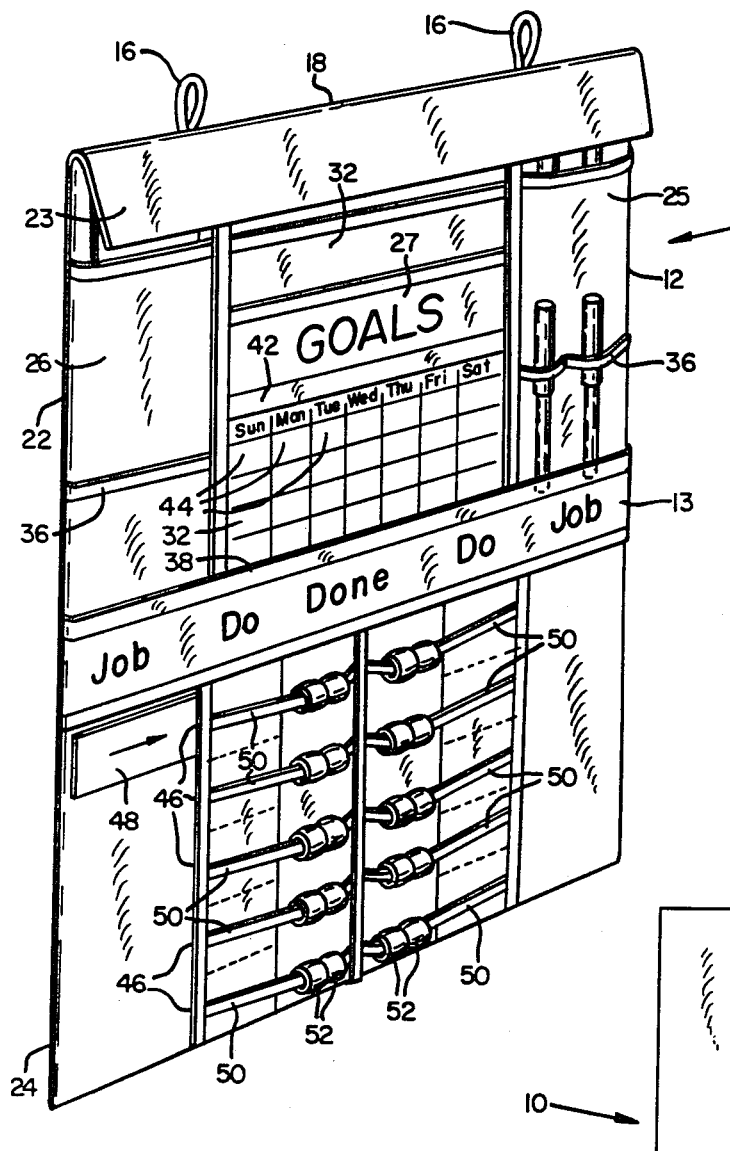
FIG. 1 is a perspective view, in an open position, of the portable, self-contained educational organizational system of the present invention.
Figure 2:
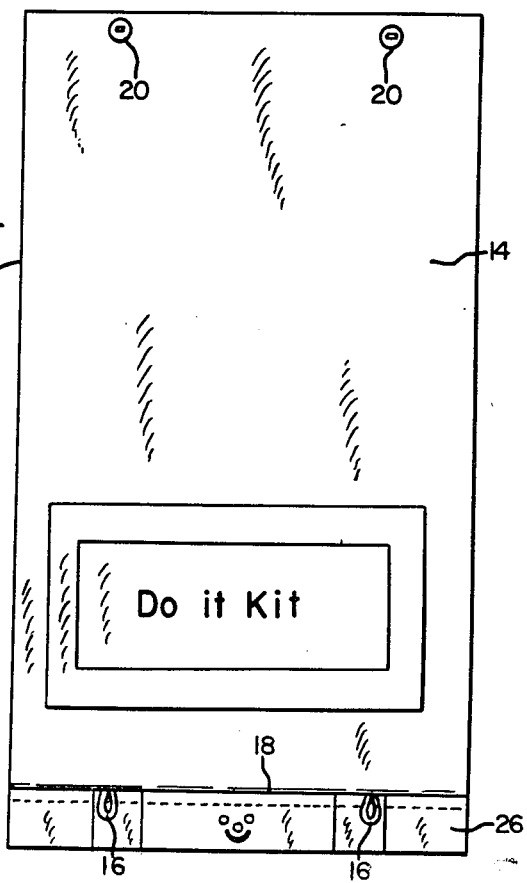
FIG. 2 is a rear elevational view of the system of FIG. 1.
Figure 3:
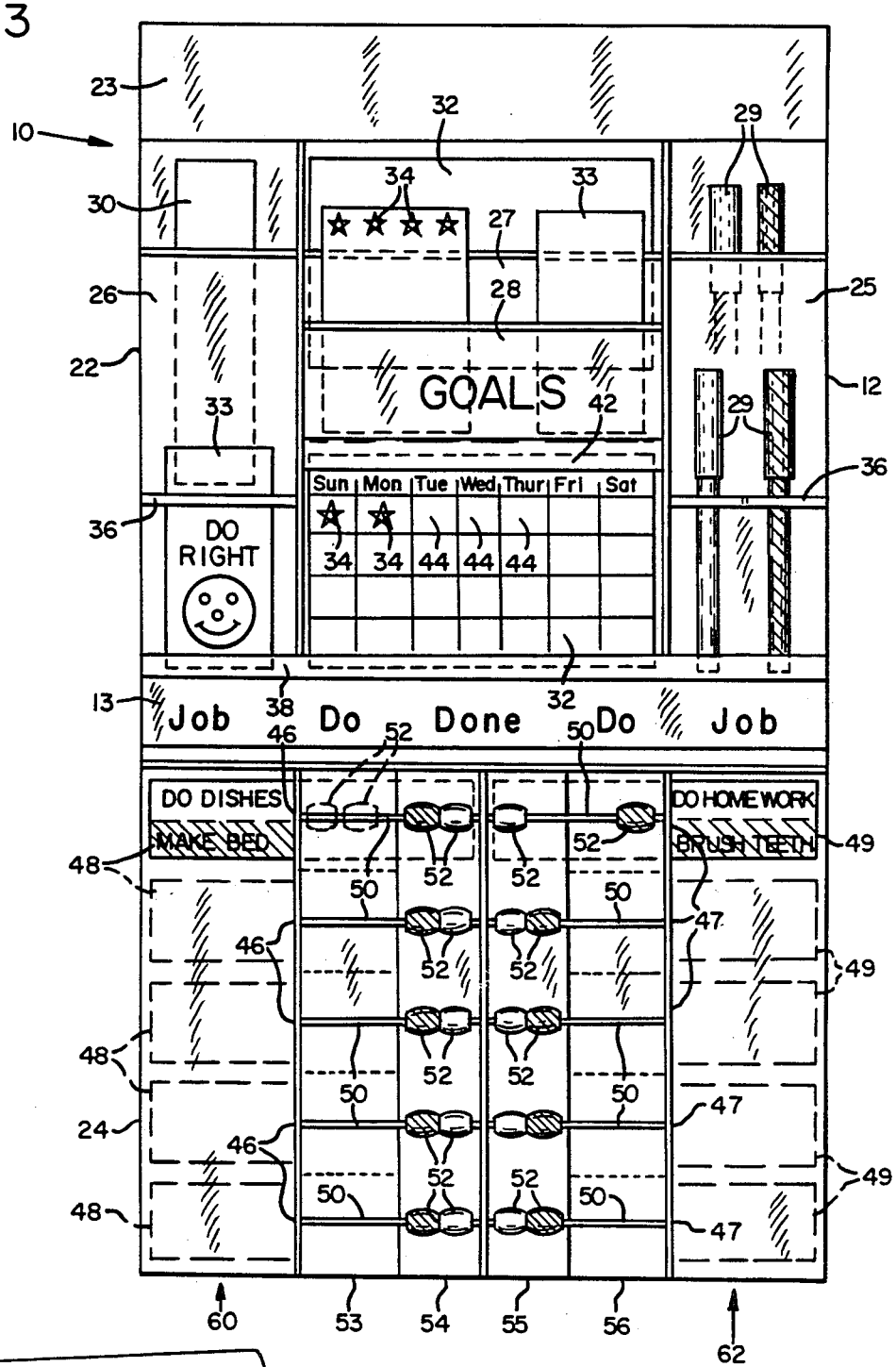
FIG. 3 is an enlarged, front elevational view of the system of FIG. 1.
Figure 4:
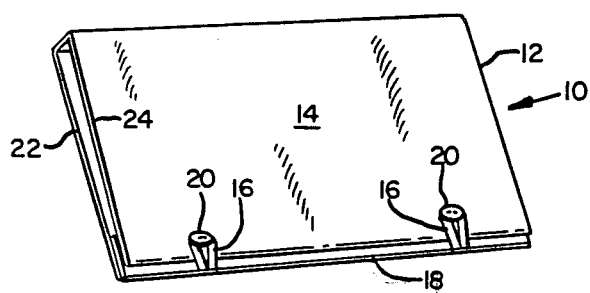
FIG. 4 is a perspective view, in the closed position, of the system of FIG. 1.

Referring to FIGS. 1-3, a portable, self-contained, educational organizational system 10 comprises a flexible, foldable body 12, having a substantially flat configuration, in the open position, the inside 13 of system 10 being shown in FIGS. 1 and 3, and the outside cover 14 of system 10 being shown in FIG. 2. A pair of fasteners 16 are joined to transverse-extending end 18 of system 10 for hanging the system 10 onto a vertical surface such as a wall or the like. To close the system 10, as depicted in FIG. 4, body 12 is folded into two sections 22 and 24, and fasteners 16 are connected about buttons 20 attached to outside cover 14. If desired, a Velcro ® strip can be used to further secure the system in a closed position. In this way, the system 10, in the closed position, is easily transportable by the user, even if the user is a small child, for implementation at various locations if desired.

Upper section 22 includes, in addition the DO IT KIT TM designation, a decorative flap 23 which covers an upper storage area. The upper storage area comprises a series of four respective storage pockets 25, 26, 27, and 28, respectively, for a pair of different color marker pens 29, for extra daily activity card forms 30, for extra long range goal card forms 32, and for extra encouragement cards 33/goal card stickers 34, respectively. At the lower portion of upper section 12 are a pair of holding loops 36 and a retaining lip 38 also for storing materials such as encouragement cards 33 and a pair of different-color marking pens 29, respectively.

Goal cards 32 in the form of a multi-week calendar for indicating completion of all daily activities are disposed between storage pockets 25 and 26, immediately below storage pocket 28, within retaining lips 38 and 42. Cards 32 indicate the long-range completion status of the above daily activities performed by the user. Therefore, after performing all of the designated activities on a given day, a star or sticker 34 is placed in the space 44 for such given day to indicate that all of the daily activities have been completed.

In the second section 24, two sets of five completed daily activity card slots 46 are each transversely-extending and longitudinally-spaced for receiving a total of ten daily activity cards 48 (five in each set of five slots) for individually listing daily activities to be performed by a user. The cards 48 include either one or two activities listed thereon by writing with color-coded markers 29.

In the central area of section 24 are located two sets of five loops 50 each disposed side-by-side, longitudinally-spaced, and connected to system body 12. Each of the loops 50 has a pair of color-coded beads 52, each having different colors, the colors of the beads 52 corresponding to the colors written on the activity cards 30 by markers 29. The beads 52 are slidably mounted on the loops 50 for movement in a transverse direction between respective first and second predetermined positions. The beads 52 are for evidencing the completion status of each designated daily activity to be performed by the user.

In use, the system 10 is transported between respective locations in a closed position as shown in FIG. 4. Therefore, the system 10 is opened by removing fasteners 16 from buttons 20, unfolding the system 10, and hanging it on a wall using loops 16. It should be noted that the system 10 can also be laid on a flat surface when in use, although hanging it is the preferred functional position.

First, a goal card 32 is removed from storage pocket 27 and inserted between retaining lips 38 and 42, respectively. Then, ten blank daily activity cards 30 are removed from storage pocket 26, and color-coded markers 29, having different colors, are removed from storage pocket 25. One must then decide what specific daily activities should be included in the plan, and in what order they are to be performed. A list of ten to twenty daily activities can be used for this purpose. If ten or less daily activities are employed, only one color-coded marker 29 is required. If, however, eleven or more activities are to be performed, both color-coded markers, of differing colors, are required to write descriptions of differing colors on a single daily activity card 30. Thus, in the first instance, when ten or less daily activities are to be performed, a marker 29 is chosen and a color-coded description of the daily activity is written or printed on each separate daily activity card in a single color. Examples of these daily activities for children are: making their bed, washing their hands and face, dressing, combing their hair, eating their breakfast, brushing their teeth, changing their school clothes, hanging up clothing, doing their homework, feeding pets, and putting their toys away, respectively. The completed daily activity cards 48, having the activities written or printed thereon, are inserted into activity card slots 46 in the order in which the user is to perform the activities, starting with the upper left slot and ending with the lower right slot.

If from eleven to twenty daily activities are to be accomplished, a description of the first activity, such as "DO DISHES," in column 60, is written or printed with a first color using the first color-coded marker at the top left of the card. Then, a description of the second activity, such as "MAKE BED," is written or printed on the bottom left of the same card using the second color-coded marker, to form a completed daily activity card. This process is then repeated with consecutively ordered activity cards 48, from top to bottom, until the activity card slots 46 in column 60 are filled. Then, the next set of five activity slots 47 in column 62 are filled, from top to bottom, with completed daily activity cards 49. In a similar manner to completed daily activity cards 48, the activities are written or printed on activity cards 49 except, instead of printing or writing them on the left side of the activity card, they are printed or written on the far right end of each daily activity card 49. Therefore, when all of the activities have been written or printed on daily activity cards 30 to form completed daily activity cards 49, they are arranged in order of priority in slots 47 starting at the top and continuing consecutively until the last card 49 has been inserted.

Next, all of the beads 52 are moved to a "Do" position. In FIG. 3, of the four centrally-located, verticallyextending columns 53, 54, 55, and 56, respectively, columns 53 and 56 are in the "Do" positions, the first predetermined position, and columns 54 and 55 are in the "Done" positions, the second predetermined position. Therefore, when the first color-coded activity on the first activity card has been completed, the corresponding color-coded bead is moved from the "Do" position to the "Done" position. Then, when the next activity is performed, the next corresponding color-coded bead is moved to the "Done" position. If ten or less activity cards have been employed, the "Done" column will include only the first color-coded beads. However, if more than ten activity cards have been employed, at least some of the "Done" columns will include a pair of color-coded beads corresponding to the pair of color-coded daily activities described and printed or written on the corresponding daily activity card. The user then proceeds to perform all of the daily activities, in order, until they have been completed, and all of the beads are in the "Done" position (see column 54 of FIG. 3).

When all activities are completed, and all of the color-coded beads are in the "Done" position, a star 34, or a decorative sticker, is placed on goal card 32 in space 44 for the particular day in which all of the activities have been completed. The placing of the star in the goal card is the reward for that particular day. All activities, in order to become habitual, must be repeated daily, preferably for a total of at least twenty-one consecutive days. The goal is the establishing of good and helpful habits and procedures. Therefore, special reward should be given at the end of each full week of stickers or stars, and an even more special reward at the end of the month of completed activities. Some weekly rewards for children may include a small case for dolls' clothing, a container for small cars, a new crayon or pencil box, or a treat at the Dairy Queen. It should be decided with the child what monthly reward should be established before the activity sequence begins. A picture of the reward item can be displayed throughout the month. The child must be excited and enthusiastic about the reward for which they have decided to work.

Other activity cards can be completed at any time and placed in slots 46 or 47 in the desired order of completion. It is important that, if a child is the user, the activities selected are those they want to become habitual in their life. The activities must be small steps that a child can easily perform. All activities must be appropriate for the age and ability level of the child. This system establishes positive habit patterns through repetition of basic activities which will eventually become part of a person's daily activities. The system is a continual visual reminder which enbles a child to "see" how they are doing the job. Viewing completed activities encourage a child to work faster to compete with himself. It also promotes goals setting, shifts responsibility to the child, and encourages the right type of behavior.

Although the cover of system 10, and the flexible components attached thereto such as the pockets, slots, lips and loops, can be made from a number of flexible materials, a fabric material being preferred since it is pliant and easy to handle, store, and operate, respectively.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A portable, self-contained, educational, organizational system, which comprises:
   a system body which, in the open position, has a longitudinally-extending, substantially flat configuration for hanging said system onto a vertical support surface, and which is composed of a flexible material foldable into a closed position so that the system can be easily transported by a user;
   at least one visually-coded activity marker means arranged on a side of said system for listing on a daily activity listing means at least one designated daily activity to be performed by said user, thereby producing a completed daily activity listing means;
   a plurality of said completed daily activity listing means arranged on said side which together comprise an organized educational plan; and
   visually-coded indicator means on said side for evidencing the completion status of each designated daily activity, the visual-coding on said indicator means being the same as the corresponding visual-coding on said completed list means.

2. The system of claim 1, wherein said respective activity marker, said completed activity listing means, and said indicator means are color-coded.

3. The system of claim 1, wherein said indicator means comprise at least one color-coded bead movable between respective first and second predetermined positions for evidencing said completion status.

4. The system of claim 3, wherein said indicator means comprise a loop means connected to said side, each said loop means having a pair of said color-coded beads, each bead having a different color, which are slidably mounted thereon for movement between respective first and second predetermined positions for evidencing said completion status.

5. The system of claim 1, wherein said daily activity listing means comprise daily activity cards, and said completed daily activity listing means comprise completed daily activity cards.

6. The system of claim 1, which further includes a fastener means for both maintaining said system in a secure, closed position and for hanging said system in an open position onto a vertical support.

7. The system of claim 1, wherein said completed daily activity listing means are arranged on said system body in priority order to produce a selectively oranized educational plan.

8. The system of claim 7, wherein said completed daily activity list means are arranged on said side in longitudinally-space columns.

9. The system of claim 1, which further includes means attached to said side for retaining said completed daily activity listing means in a fixed position thereon.

10. The system of claim 1, which further includes means for indicating the long-range completion status of said daily activities performed by said user.

11. A method for implementing an organized educational plan by a user, which comprises:
   providing a portable, self-contained educational organization system to a user comprising a system body which, in the open position, has a longitudinally-extending, substantially flat configuration for hanging said system onto a vertical support surface, and which is composed of a flexible material foldable into a closed position so that the system can be easily transported by a user; at least one visually-coded activity marker means arranged on a side of said system for listing on a daily activity listing means at least one designated daily activity to be performed by said user, thereby producing a completed daily activity listing means; a plurality of said completed daily activity listing means arranged on said side which together comprise an organized educational plan; and visually-coded indicator means on said side for evidencing the completion status of each designated daily activity, the visual-coding on said indicator means being the same as the corresponding visual-coding on said completed list means;

writing at least one visually-coded activity to be performed by said user onto each of a plurality of said daily activity listing means to produce a plurality of visually-coded completed daily activity listing means which together comprise an organized educational plan;

retaining in a fixed position on said side said organized education plan;

performing on a daily basis by the user the designated daily activities listed in said plan;

moving each said indicator means on completion of said performance of each said activity by said user from a first predetermined position to a second predetermined position to evidence the completion status thereof; and repeating said respective activities performing step and indicator means moving steps on a daily basis for a predetermined period of time.

12. The method of claim 11, wherein said plurality of visually-coded completed daily activity list means are arranged in priority order to produce a selectively organized educational plan.

13. The method of claim 11, wherein said indicator means is color-coded, and said method further includes the step of listing at least one color-coded activity onto said daily activity list means, and, after performing said designated activity, moving said corresponding color-coded indicator means from said first predetermined position to said second predetermined position to evidence said completion status.

14. The method of claim 11, wherein each said indicator means comprises loop means connected to said side, each said loop means having a pair of color-coded beads, each bead having a different color, and being slidably mounted thereon for movement between said respective first and second predetrrmined positions for evidencing said completion status, and said method further includes the step of listing at least one color-coded activity onto each said daily activity list means and, after performing each said designated activity, moving said corresponding color-coded indicator means from said first predetermined position to said second predetermined position to evidence said completion status.

15. The method of claim 11, which further includes the steps of providing means for indicating the long-range completion status of said daily activities performed by said user, and after performing all of said designated activities on a given day, recording on said long-range indicator means that all of said daily activities have been completed.

16. The method of claim 11, which further includes the steps of providing a long-range completion means comprising a monthly calendar having daily recording intervals, and recording the completion of the performance of all said activities in said daily recording intervals thereby providing goal-setting functionality to said system.

17. A portable, self-contained educational, organizational system, which comprises:

a system body which, in the open position, has a longitudinally-extending, substantially flat configuration for hanging said system onto a vertical support surface, and which is composed of a flexible material foldable into a closed position so that the system can be easily transported by a user;

at least one color-coded activity marker means arranged on the inside side of said system body for listing on a daily activity card at least one designated daily activity to be performed by said user, thereby producing a completed daily activity card;

a plurality of said completed daily activity cards arranged on said side which together comprise an organized educational plan;

loop means attached to the inside of said system body;

a pair of color-coded beads slidably mounted on said loop means for movement between respective first and second predetermined positions for evidencing the completion status of each designated daily activity, the color-coding on each indicator means being the same as the visual-coding on the corresponding completed daily activity card; and means for indicating the long-range completion status of said daily activities performed by said user, and after performing all of said designated activities on a given day, recording on said long-range indicator means that all of said daily activities have been completed.

18. The system of claim 17, which further includes means defining a reward to the user for the long-range completion of the performanc: of said daily activities.

19. The system of claim 17, which further includes fastening means attached to said system body for both maintaining said system in a secure, closed position and for hanging said system, in the open position, onto a vertical support.

20. The system of claim 17, which further includes means for storing said daily activity cards, said markers, and said long-range completion status means.

* * * * *